United States Patent
Najbar et al.

(10) Patent No.: US 10,967,328 B2
(45) Date of Patent: Apr. 6, 2021

(54) METHOD OF SIMULTANEOUS REMOVAL OF NO AND CARBON PARTICLES AND INORGANIC DUST FROM FLUE GASES AND CATALYTIC REACTOR FOR REMOVAL OF NO AND CARBON PARTICLES AND INORGANIC DUST FROM FLUE GASES

(71) Applicant: UNIWERSYTET JAGIELLONSKI, Cracow (PL)

(72) Inventors: Mieczyslawa Najbar, Cracow (PL); Ryszard Lech, Cracow (PL); Marek Danielewski, Jerzmanowice (PL); Janusz Budzioch, Cracow (PL)

(73) Assignee: UNIWERSYTET JAGIELLONSKI, Cracow (PL)

( * ) Notice: Subject to any disclaimer, the term of this patent is extended or adjusted under 35 U.S.C. 154(b) by 1520 days.

(21) Appl. No.: 14/363,807

(22) PCT Filed: Dec. 10, 2012

(86) PCT No.: PCT/PL2012/000129
§ 371 (c)(1),
(2) Date: Jun. 8, 2014

(87) PCT Pub. No.: WO2013/085402
PCT Pub. Date: Jun. 13, 2013

(65) Prior Publication Data
US 2018/0050306 A1    Feb. 22, 2018

(30) Foreign Application Priority Data

Dec. 8, 2011 (PL) .......................... 397288

(51) Int. Cl.
*B01D 53/24* (2006.01)
*B01D 53/40* (2006.01)
(Continued)

(52) U.S. Cl.
CPC ......... *B01D 53/8631* (2013.01); *B01D 53/24* (2013.01); *B01D 53/40* (2013.01);
(Continued)

(58) Field of Classification Search
CPC ................ B01D 53/40; B01D 53/8631; B01D 2255/20738; B01D 2257/404;
(Continued)

(56) References Cited

U.S. PATENT DOCUMENTS 2,453,593 A * 1/1946 Putney ................... B01D 46/00
                                                   183/77
4,834,962 A * 5/1989 Ludwig ................... B01D 5/00
                                                   423/351
(Continued)

FOREIGN PATENT DOCUMENTS

DE         35 36 315 A1 *  4/1987 ............ B01F 5/0616
WO      WO 9530119 A1 * 11/1995 ............. B04C 5/081

*Primary Examiner* — Timothy C Vanoy
(74) *Attorney, Agent, or Firm* — Ralph E. Jocke; Walker & Jocke

(57) ABSTRACT

A method for simultaneous removal of NO and carbonic particles and inorganic dust from flue gases in a reactor with a catalyst for direct decomposition of nitric oxide located on a metallic monolith, includes tangential introduction of flue gases to the reactor circumference. Flue gases flow rotationally and downwards in the reactor in contact with an undulating surface of metallic foil located on an inner wall of the reactor chamber and in contact with the catalyst on a spiral band falling to the lower part of the reactor, and next flue gases jet direction counter-currently to a cylindrical inner chamber containing slices of the monolithic catalyst disturbing laminar flow of the flue gases jet. The reactor arrangement provides for simultaneous removal of NO and carbon particles and inorganic dust from flue gases.

20 Claims, 8 Drawing Sheets

(51) Int. Cl.
*B01D 53/82* (2006.01)
*B01D 53/86* (2006.01)
*B04C 5/04* (2006.01)

(52) U.S. Cl.
CPC ......... *B01D 53/82* (2013.01); *B01D 53/8628* (2013.01); *B01D 53/8678* (2013.01); *B04C 5/04* (2013.01); *B01D 2255/20738* (2013.01); *B01D 2255/20753* (2013.01); *B01D 2255/405* (2013.01); *B01D 2257/404* (2013.01); *B01D 2258/0283* (2013.01)

(58) Field of Classification Search
CPC .......... B01D 53/8678; B01D 2255/405; B01D 53/24; B01D 53/82; B01D 53/8628; B01D 2255/20753; B01D 2258/0283; B01D 53/56; B01D 53/74; B01D 45/12; B01D 45/14; B04C 5/04; B01J 19/00; B01J 19/2405; B01J 19/246; B01J 2219/00; C01B 21/36
See application file for complete search history.

(56) References Cited

U.S. PATENT DOCUMENTS

| | | | | |
|---|---|---|---|---|
| 7,250,066 B2 * | 7/2007 | Seipler | ................... | B01D 45/14 |
| | | | | 55/337 |
| 7,776,293 B2 * | 8/2010 | Downs et al. | ......... | B01D 53/34 |
| | | | | 423/210 |
| 9,162,216 B2 * | 10/2015 | Najbar et al. | ........ | B01J 23/8892 |
| | | | | 502/337 |
| 2011/0123403 A1 * | 5/2011 | Sato et al. | ............. | B01D 53/00 |
| | | | | 422/120 |

\* cited by examiner

1

METHOD OF SIMULTANEOUS REMOVAL OF NO AND CARBON PARTICLES AND INORGANIC DUST FROM FLUE GASES AND CATALYTIC REACTOR FOR REMOVAL OF NO AND CARBON PARTICLES AND INORGANIC DUST FROM FLUE GASES

TECHNICAL FIELD

The subject of the invention is the method of nitric oxide (NO) removal from flue gases containing oxygen and the reactor for removal of NO, first of all from dusty flue gases which are generated by the stationary emission sources.

BACKGROUND

Hitherto the removal of NO from the dusty flue gases is carried out in this way, that the flue gases containing NO flow axially to the inlets of the channels of a monolithic catalyst and the flow is laminar. The catalyst is prepared using a ceramic, fire-resistant material or metal foil and it is covered by a catalytic active substance. During laminar flow through the channels of the monolithic catalyst the flue gases come into contact with the catalyst and the chemical reactions occur. Reduction of NO to $N_2$ is the result of these reactions. Simultaneously the solid particles deposit on the surface of the monolithic catalyst and it is necessary to remove those particles periodically using mechanical methods.

A catalytic reactor for cleaning the dust-free flue gases in which cleaning of gases occur almost evenly in central and outer parts of the metallic monolithic catalyst is well-known from the description of the Japanese patent No. 2006-196988. In the appliance, a magnetic substance and catalytically active substance are contained in layers created on surfaces of the channels of a metallic monolith. The monolith is cylindrical or elliptical or quadrangular and it is made out of undulating austenitic stainless steel. On the outer side of the monolithic catalyst a stable magnet is placed or a magnetic field generator. The monolithic catalyst is located in a casing, which is made of non-magnetic material with high thermal resistance. The casing is located between the stable magnet or the magnetic field generator and the monolithic catalyst, which is enveloped by a ceramic fibre mat. The mat is a thermal insulator of heat transported from cleaned gases to the stable magnet or the magnetic field generator. The cleaned flue gases are directed to an inlet cross-section of the monolithic catalyst using a flue gas channel. The geometric axis of the flue gas channel and the geometric axis of the monolithic catalyst overlap. A diffuser is installed at the end of the flue gas channel and it is a coupler between the flue gases channel and the metallic casing of the monolithic catalyst. The flue gases are cleaned as a result of a chemical reaction proceeding on the catalyst during their flow through the channels of the monolithic catalyst created from an undulating metallic foil.

SUMMARY

The aim of the invention is the method and the reactor for the direct removal of nitric oxide from the dusty flue gases allowing for simultaneous efficient decomposition of nitric oxide and systematic removal of solid particles, especially carbonic particles.

The method of the flue gases cleaning according to the invention includes simultaneous removal of NO and the solid particles from the flue gases as well as in the possible combustion of the carbon particles carried by the flue gases. Those processes proceed due to repeated contacts of the flue gases and the dust with the surfaces containing the active catalyst. The contacts are ensured by the changes of the flue gases jet flow direction in the reactor.

The removal of nitric oxide and the solid particles from the dusty flue gases according to the invention is performed in the reactor with the catalyst for direct decomposition of nitric oxide deposited on a metallic monolith. According to the method of the invention the dusty flue gases enter the reactor tangentially to a circumference. It causes a rotational flow of the flue gases downwards. The flow undergoes disturbance because of the contact of the flue gases jet with an undulating surface of the metallic foil placed on an internal wall of the reactor chamber and a split of the flue gases jet due to contact with a spiral band of the foil. The surface of the metallic foil placed on the internal wall of reactor chamber as well as the surface of the spiral band are covered by the active component of the catalyst. Afterwards a flue gases jet is directed countercurrently to a cylindrical inner chamber, in which the slices of the monolithic catalyst are installed and the laminar flow of the flue gases is disturbed. In the course of the cleaning process the falling solid particles are accumulated on a bottom of the reactor.

The preferred disturbance of flue gases laminar flow in the inner chamber of the reactor is achieved by spacers present between parallel slices of the monolithic catalyst in the reactor or by nonparallel location of the slices of the monolithic catalyst.

Preferably, the porous slices of the monolithic catalyst with variable porosity are used. The preferred temperature in the reactor is in the range of 150° C.-450° C. Preferably an oxide catalyst made by direct oxidation of the foil, especially if the acid-proof austenitic steel foil is used. The catalyst in the most favourable form contains the phase with $\alpha Fe_2O_3$ structure and the phases with spinel structure having the lattice parameters closed to those of $NiFe_2O_4$ or the spinel phases only. The phases create microcrystallities, which contain Cr and Mn additionally and possibly also Si (Polish patent application P.395905). Using this kind of a catalyst it is possible to remove simultaneously the nitric oxide, the solid particles and to combust the carbon particles contained in the dust transported in the flue gases jet.

The catalytic reactor for removal of nitric oxide and the carbon particles and the inorganic dust from dusty flue gases according to the invention comprises the catalyst on the metallic support for the direct removal of nitric oxide. The reactor is at least partially cylindrical and is equipped with a thermal insulation and its inlet is located in an upper part in such a way, that the flue gases are introduced tangentially to the reactor circumference. The upper part contains a chamber with an undulating inner surface, which is covered by an active catalyst phase. The spiral band made of acid-proof steel foil and covered by the active phase of the catalyst is located inside of the chamber with the undulating inner surface and moreover the spiral band falls downwards. There is an inner chamber heated with an inner heater in the geometric axis of the chamber with the undulating inner surface. The slices of the monolithic catalyst are installed in that chamber. The reactor is equipped with a casing containing two cylindrical coaxial walls with an insulating material between them. A casing heater adjoins at least to a part of the inner wall of the casing. In the lower part of the reactor a tight closure is located and it is simultaneously a dust container.

Preferably, the catalyst is also located on the outer surface of the inner chamber.

It is possible to locate slices of the catalyst parallel towards each other and vertically towards the reactor axis. In this case the directing spacers are installed between the slices of the monolith catalyst. The shape of the directing spacers induces the rotational flow of the flue gas jet. The most preferred is the shape of a propeller or similar to the shape of the propeller.

If the front of the monolithic slices of the catalyst is located in such a way, that the ratio of the distance L measured from the inlet to the heated chamber of the slices of the monolithic catalyst to the inner diameter d of the heated chamber of the slices of the monolithic catalyst L/d>50, then the directing spacer is being set in front of the inlet to the slice of the monolithic catalyst. But if the ratio L/d<50, then the directing spacer is not being set before inlet to the porous support of the catalyst.

It is possible to situate the slices of the monolithic catalyst at an angle towards other slices and towards the axis of the reactor.

Preferably, there is an additional heater in axis of the heated chamber of the slices of the monolithic catalyst located.

Preferably, the reactor has a cylindrical shape in the part, where the cylindrical chamber with undulating surface is located, and a conical shape in the remaining part. The chamber with undulating surface may be in contact with the internal wall of the reactor casing.

The method and the reactor according to the invention are designed especially for the removal of NO and carbonic particles and inorganic dust from flue gases created in the stationary emission sources.

Multi-stage process of the decomposition of nitric oxide and the removal of the solid particles occurs in the reactor according to the invention. Flue gases in the reactor come to contact with the catalyst located on the metallic surfaces. They simultaneously direct the flow of flue gases, making a countercurrent arrangement of the jets in the reactor. The first stage of the catalytic reactor is the chamber with undulating inner surface, the second one is the spiral band. The spiral band forms a spiral flow of flue gases around its geometrical axis, directing flue gases downwards of the reactor, besides the catalytic performance. The change of the direction of flue gases flow causes removal of the solid particles from the cleaned flue gases jet and increases an inlet effect in the slices of the monolithic catalyst. Removal of the dust containing the solid particles from flue gases jet is caused by the flow of the gaseous jet according to a curved trajectory. Dust from the flue gases comes to the contact with the catalyst located on the surface of the first stage of the multistage catalytic reactor and while it is falling down under influence of the gravitational force, it is being removed from the flue gases jet and moreover the carbonic particles contained in the dust are totally oxidized due to the activity of the catalyst, if the catalyst contained in the reactor enables the oxidation process.

The flue gases jet with lower contents of the solid particles flows to the heated chamber of the slices of the monolithic catalyst. The inlet to the heated chamber of the slices of the monolithic catalyst, which is the next stage of the multistage catalytic reactor is located in the lower part of the cylindrical chamber with undulating inner surface and the spiral band in such a way, that the cleaned flue gases change the flow direction turning back to the heated chamber of the slices of the monolithic catalyst and countercurrently come to the reactor inlet being already cleaned in a significant degree from the dust contained in the inlet flue gases of the reactor. In the inner chamber of the multistage catalytic reactor the slices of the monolithic catalyst are installed and the cleaned flue gases flow through their channels. Gas flowing in countercurrent continuously comes into the contact with the catalyst causing its cleaning, but to make the contact easier and to increase a purity degree of the flue gases, the flow of the flue gases jet in the last stage of the multistage catalytic reactor is subjected to often changes of the direction, forcing the cleaned flue gases jet into an alternating rotational or rectilinear flow. The change of the direction of the flow is achieved by means of the directing spacers or due to location of the slices of the monolithic catalyst at an angle towards the plane of the cross-section of the reactor. The directing spacer is never located on the outlet of the last slice of the monolithic reactor. Flow of the cleaned gas through the slices of the monolithic catalyst depends on the shape and area of the cross-section of their channels, which are variable in a preferred version. The change of the direction of the flow of cleaned flue gas intensifies contact between dusty gas and the catalyst. The dust removed from flue gases jet is collected in a tight closure of the reactor and it is periodically removed from the tight closure of the reactor. During normal exploitation of the reactor the tight closure does not allow for an entrainment of the air from environment.

The method and the reactor according to the invention enable intensive, continuous contact of flue gases with highly developed surface of the catalyst and assure changeability of the flue gases flow direction. The contact of the flue gases with the catalyst located on the surface of the channels is facilitated due to very often changes of the flow direction of flue gases simultaneously enabling of the removal of dust from the flue gases jet.

DETAILED DESCRIPTION

Figure 1:
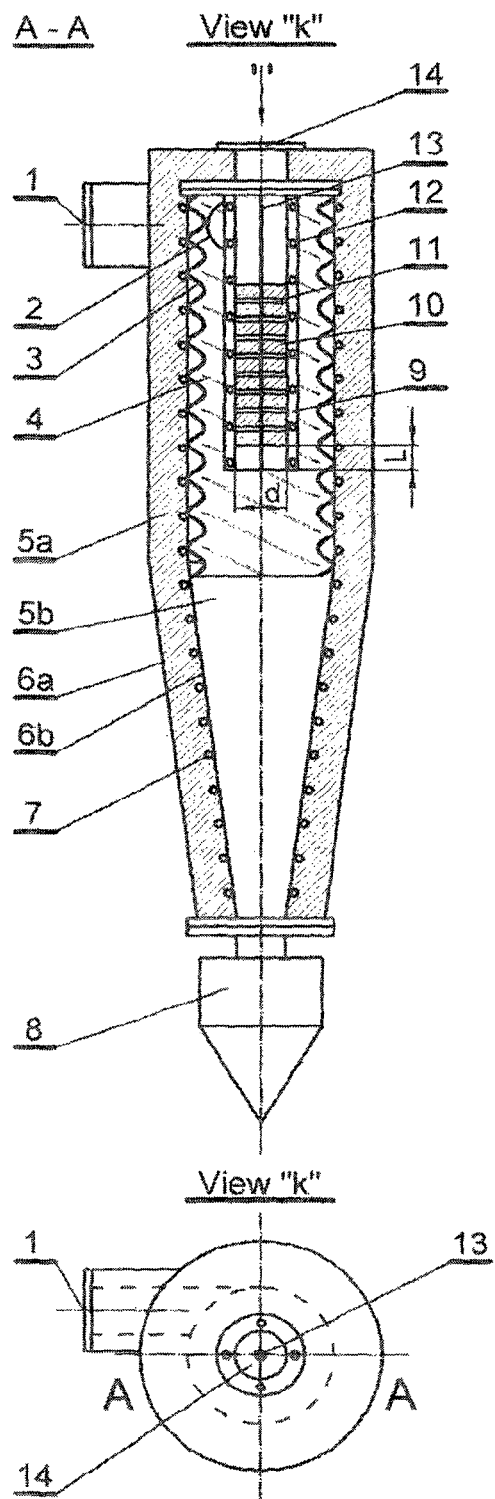
FIG. 1 is a top and cross-sectional view of an exemplary reactor structure arrangement.
Figure 2:
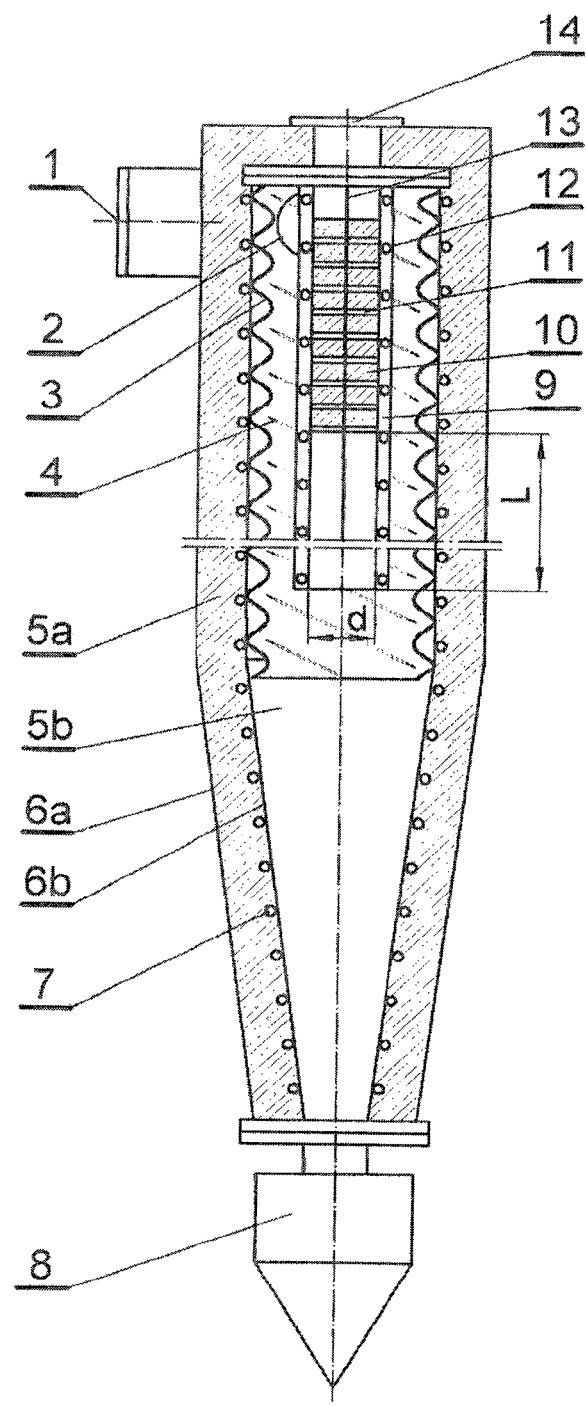
FIG. 2 is a cross-sectional view of an alternative exemplary reactor structure arrangement.
Figure 3:
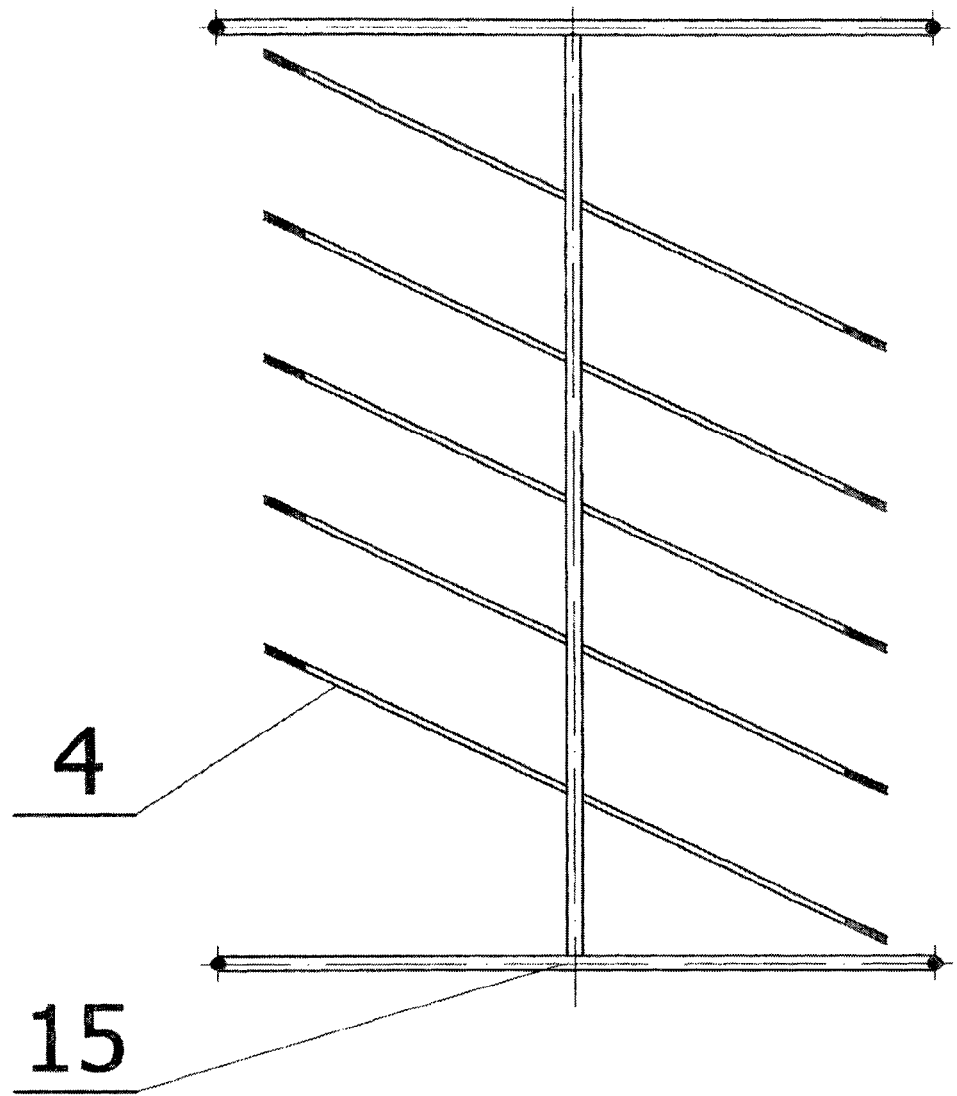
FIG. 3 shows an exemplary spiral band comprised of a single part which may be used in exemplary reactor arrangements.
Figure 4:
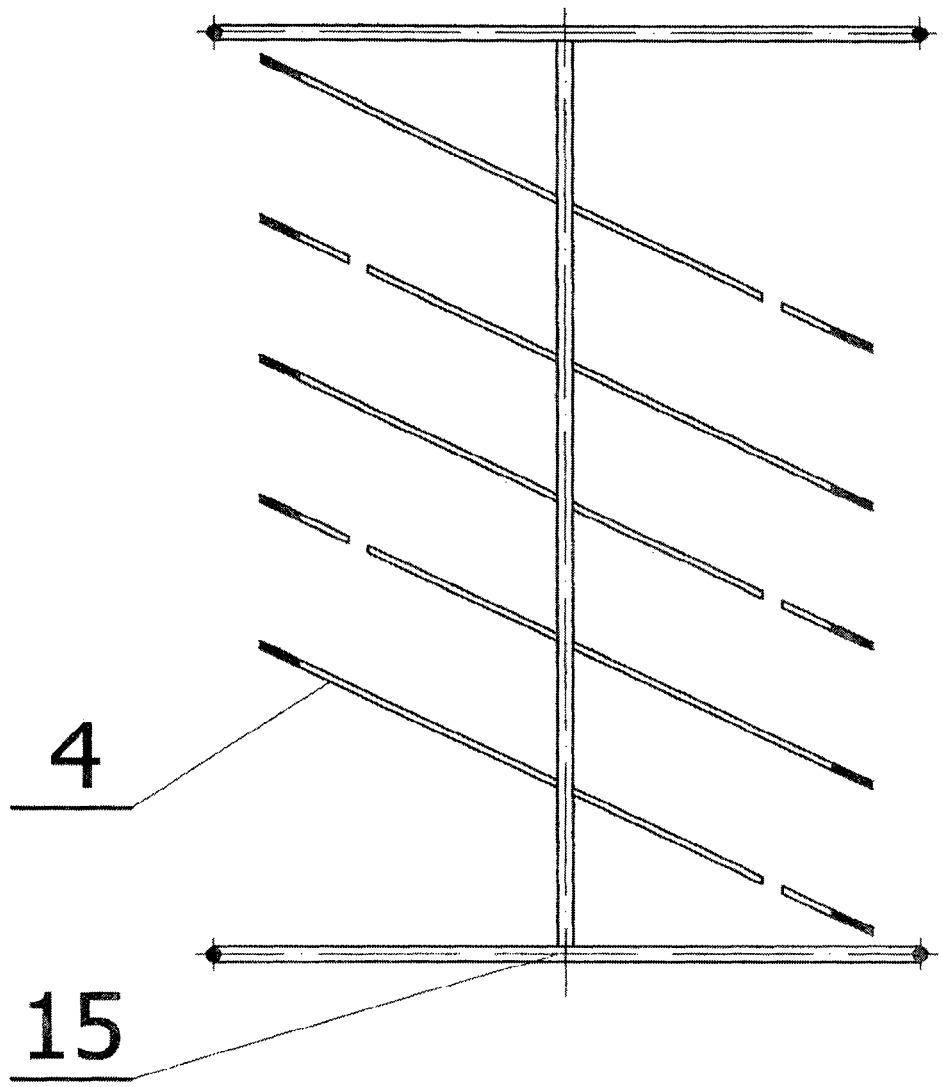
FIG. 4 shows an alternative exemplary spiral band comprised of multiple parts which may be used in exemplary reactor arrangements.
Figure 5:
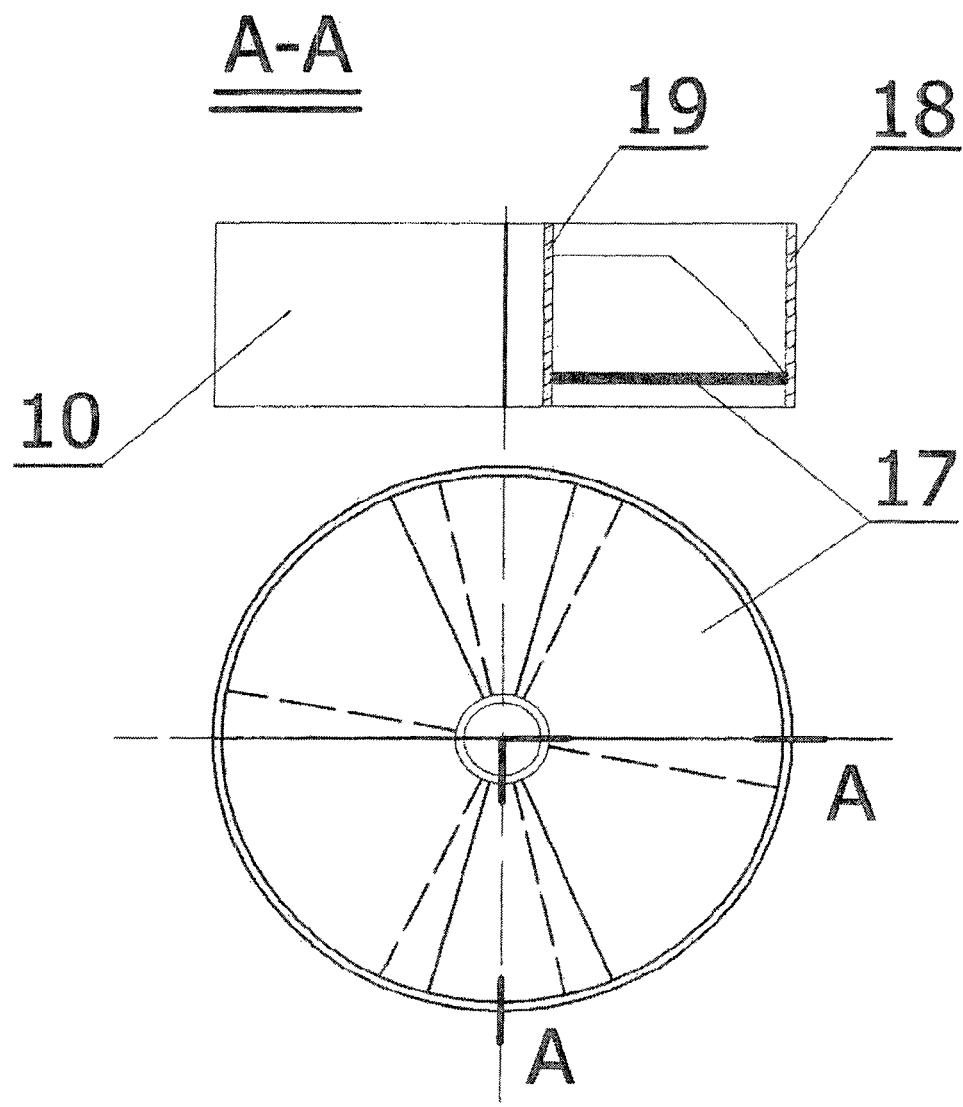
FIG. 5 shows an exemplary directing spacer.
Figure 6:
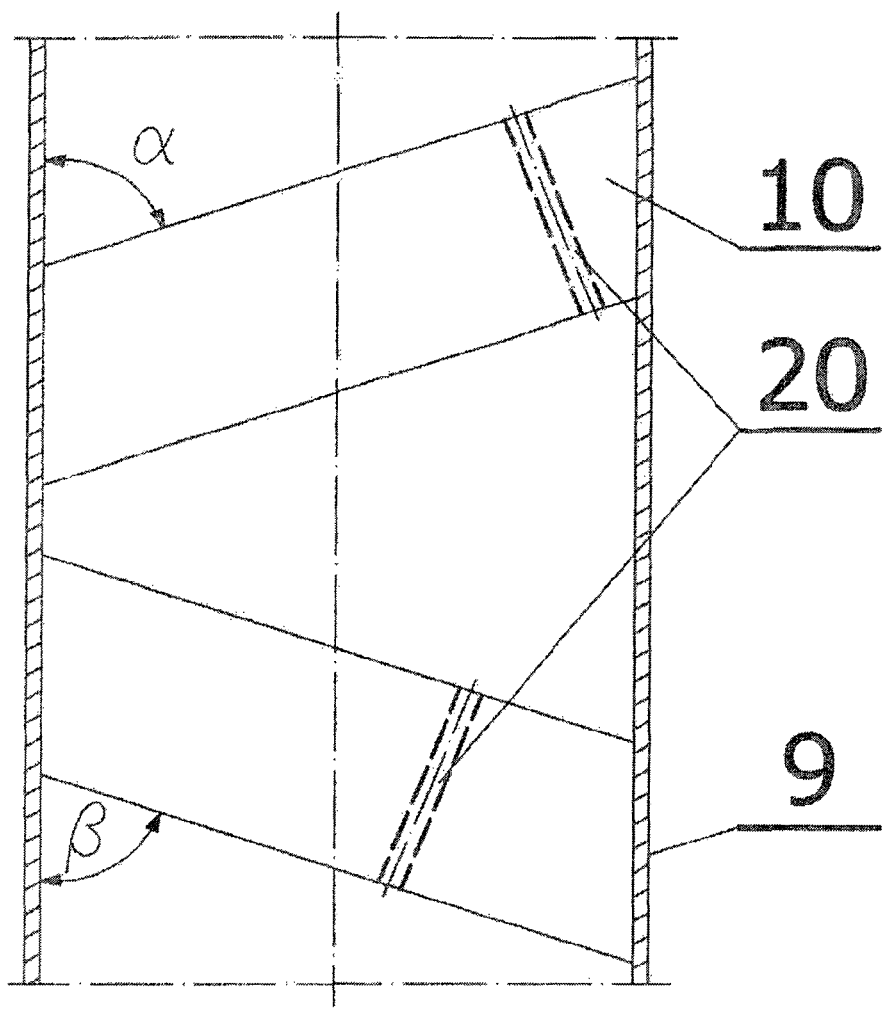
FIG. 6 shows slices of a monolithic catalyst of an exemplary arrangement extending at different angles.
Figure 7:
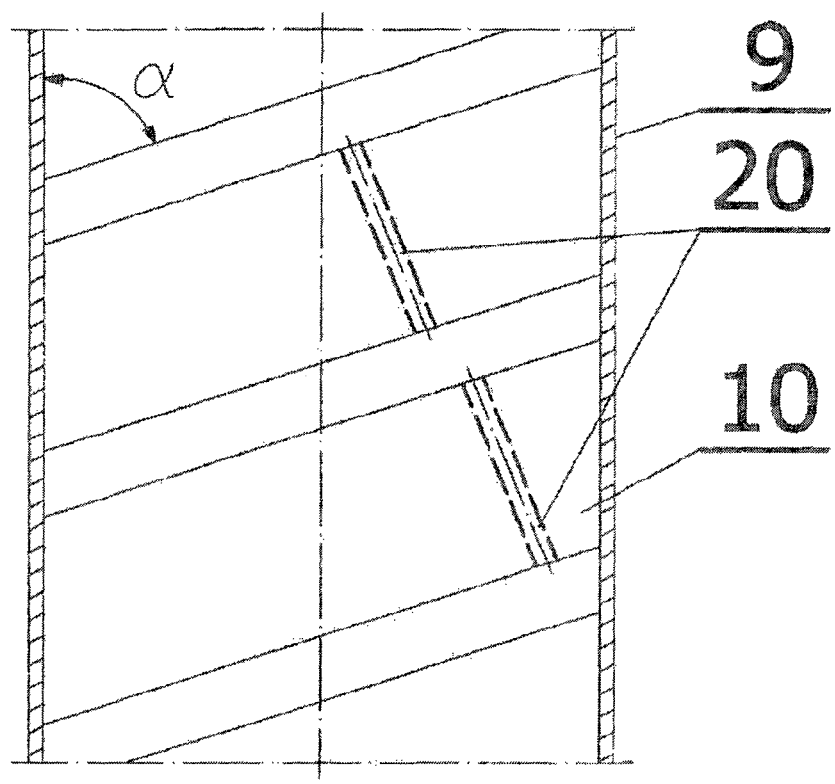
FIG. 7 shows slices of a monolithic catalyst of an alternative exemplary arrangement extending parallel to one another.
Figure 8:
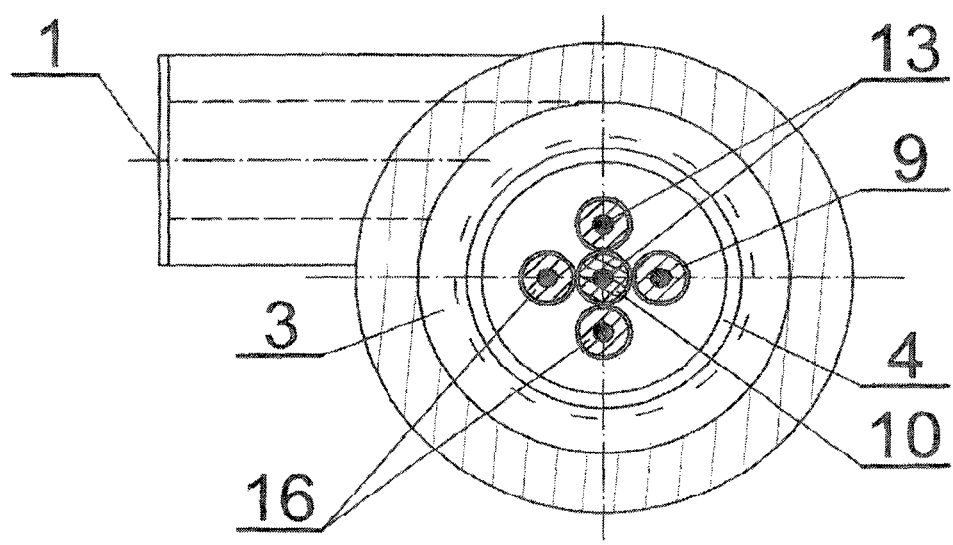
FIG. 8 shows slices of a monolithic catalyst of a further exemplary arrangement with various cross-sectional sizes.

The examples of reactor structure according to the invention are shown on the schematic drawings. A longitudinal-section and cross-section of the reactor are shown in FIG. 1 for the ratio L/d<50. The longitudinal-section of the reactor for ratio L/d>50 is shown in FIG. 2. The spiral band, which is formed in one part is shown on FIG. 3. The spiral band, which is prepared in separate parts is shown in FIG. 4. The directing spacer is shown in FIG. 5. The slices of the monolithic catalyst installed under the various angles are shown in FIG. 6. The slices of the monolithic catalyst situated parallel towards each other are shown in FIG. 7. And the slices of the monolithic catalyst with various sizes of their cross-section are shown in FIG. 8.

An example of the reactor structure according to the invention is made out for ratio of the dimensions L/d<50. The dusty gas generating in a stable emission source is supplied using feeding channel 1 which is thermally insulated from environment impact and the gas is introduced using the dusty gas inlet 2 tangentially to the surface of the cylindrical chamber with the undulating inner surface 3 for removal of NO and solid particles as well as for the oxidation of carbonic particles presented in dust transported by the gaseous jet. The catalyst enabling the removal of NO from the gaseous mixture and oxidation of carbonic particles occurs on the undulating cylindrical surface prepared using acid-proof austenitic steel foil. The oxide phases created on the acid-proof austenitic steel foil by oxidation are liable to arise as the catalyst. Inside the cylindrical and undulating chamber 3 the spiral band 4 made of the austenitic acid-proof steel covered by the oxide phases is located and it is falling downwards of the chamber 3 and it is the support of the catalyst for removal of NO and for the oxidation of carbonic particles contained in the dust. The spiral band may be prepared as one part or it may be prepared from separate parts creating the band, as it is shown on FIG. 4, but distances between the individual bond parts should not overlap according to the band pitch. The spiral band 4 is stretched out on the band frame 15. The cylindrical and undulating reactor chamber 3 is placed in the casing composed of the cylindrical part 5a and the conical part 5b. The casing contains thermal insulation, e.g. a light heat-resistant insulating material, and the insulation is placed between the two coaxial walls: the outer casing wall 6a and the inner casing wall 6b but the heater 7 of the casing is in touch with the inner casing wall 6b. The conical part 5b of the reactor in its lower part is equipped with the tight closure 8, which is simultaneously a periodically cleaned dust container. In the geometrical axis of the cylindrical undulating chamber 3 a heated chamber of the slices of the monolith catalyst 9 is placed and its surface are covered by the active component of the catalyst. In the heated chamber of the slices of the monolith catalyst 9 the slices of the monolithic catalyst 10 and/or 16 are located and they are of different area of the channel cross-sections. The slices of the monolithic catalyst 10 and/or 16 are covered by the same active component of the catalyst as the cylindrical chamber of the reactor with undulating surface 3 and the spiral band 4.

If the ratio L/d<50 the directing spacer 11 shown on FIG. 5, is not situated in the front of the inlet to porous support of the catalyst 10 and/or 16. The directing spacer 11 consists of the blades 17, which are sloped at small angle towards level and fastened between the outer ring 18 and the inner ring 19. On the wall of heated chamber of the slices of the monolithic catalyst 9 the chamber heater 12 is installed. In the geometrical axis of the heated chamber of the slices of the monolithic catalyst 9 an additional axial heater 13 is located. The heated chamber of the slices of the monolithic catalyst 9 is equipped with the gaseous outlet 14. The slices of the monolithic catalyst 10 may be placed under the various angles α (alpha) or β (beta) towards the axis of the heated chamber of the slices of the monolith catalyst 9 as it is shown in FIG. 6, in order to attain a change of the flow direction for achieving an effect of inlet flow to the slice of the monolith catalyst. At the time the directing spacers 11 are not applied. The channels 20 in slice of the monolithic catalyst are shown in FIG. 6. The change of the flow direction before the inlet to the slices of the monolithic catalyst is achieved when the slices of the monolithic reactor are parallel towards themselves, but under angle α (alpha) towards the axis of the heated chamber of the monolithic slices of the catalyst 9, as it is shown in FIG. 7. There is a space filled by the flue gases jets between the slices of the monolithic catalyst 10 with both arrangement of the slices of the monolith catalyst 10 shown in FIGS. 6 and 7.

The example of the structure of the reactor according to the invention shown in FIG. 2 is designed for the case of the dimensions ratio L/d>50. The difference in the example of the structure shown in FIG. 2 in comparison with the structure shown in FIG. 1 is in the location of the directing spacer 11 in the front of the inlet to the porous slice of the monolithic catalyst 10 or 11, when the front of the porous support of the catalyst 10 is in position that the ratio L/d>50.

In both the cases of the realization the length of the heated chamber of the slices of the monolithic catalyst 9 should be as long as possible in order to achieve maximum distance for the flow of the flue gases.

It is possible to apply the slices of the monolithic catalyst 16 with the area cross-sections of the channels different from the area cross-sections of the channels of the slices of the monolithic catalyst 10 that is seen in FIG. 8.

The slices of the monolithic catalyst 10 are of the same or the various shapes and dimensions of the channels cross-sections and each chamber may contain the slices of the monolithic catalyst with the various shapes and cross-sections.

NOTATION

1—feeding channel
2—dusty gas inlet
3—cylindrical chamber of reactor with undulating inner surface
4—spiral band
5a—cylindrical part of casing
5b—conical part of casing
6a—outer casing wall
6b—inner casing wall
7—heater
8.—tight closure
9—heated chamber of the monolith slices of catalyst
10—slice of monolithic catalyst
11—directing spacer
12—chamber heater
13—axial heater
14—gas outlet
15—band frame
16—slice of monolith catalyst with variable shape and dimensions of cross-section of the channels
17—blade
18—outer ring
19—inner ring
20—channel of slice of a monolithic catalyst

The invention claimed is:
1. A method comprising:
a) receiving flue gasses into a reactor including a body, wherein the body includes a heated annular inner wall with an undulating inner wall surface,
and wherein the received flue gases are directed to move rotationally within the body by the inner wall,
b) directing the rotationally moving flue gasses downwardly within the body by engagement with a spiral band coated with a catalyst operative to directly remove NO from the gasses, c) enabling the gas that has been directed downwardly by the band to pass upwardly through a cylindrical heated chamber within the body to a flue gas outlet from the body,
    wherein the chamber includes a plurality of slices including the catalyst,
whereby NO, carbonic particles and inorganic dust are removed from the gas by the reactor.

2. The method of claim 1, wherein in the chamber the plurality of slices extend parallel to one another and at least one directing spacer is positioned intermediate of the at least some of the plurality of slices,
    wherein in (c) the at least one directing spacer disturbs laminar flow of the flue gases through the chamber.

3. The method of claim 1 wherein within the chamber, a directing spacer is positioned intermediate of at least two of the plurality of slices,
    wherein the plurality of slices are arranged nonparallel to one another,
    wherein in (c) the directing spacer is operative to disturb the laminar flow of the flue gases through the plurality of slices.

4. The method of claim 1, wherein
    the plurality of slices have various shapes and dimensions,
    and wherein in (c) the gas passes through slices having various shapes and dimensions.

5. The method of claim 1, wherein in (a), the flue gases inside the reactor body are in the range of 150° C.-450° C.

6. The method of claim 1, wherein in at least one of (b) and (c), simultaneous removal of NO and total oxidation of carbonic particles contained in dust transported by the flue gasses occurs.

7. The method of claim 1, wherein in (a) the flue gasses are received in the reactor from a stationary emission source.

8. Apparatus comprising:
    a reactor configured for removal of NO, carbonic particles and inorganic dust from flue gases including:
    a reactor body configured to extend along a vertical axis,
        wherein the reactor body includes a portion having a cylindrical shape,
        the portion including
            an annular inner wall,
                wherein the inner wall includes an undulating inner surface,
            an annular outer wall,
                heat resistant material extending intermediate of the inner wall and the outer wall,
            an upper part,
            a closed lower end,
    an inner wall heater configured to heat the inner wall,
    a cylindrical chamber, wherein the chamber is concentric with and disposed radially inward from the inner wall,
    a chamber heater configured to heat the chamber,
    a spiral band,
        wherein the spiral band
            is disposed radially intermediate of the inner wall and the chamber,
            is configured to direct gas toward the lower end,
            is coated with a catalyst operative to directly remove NO,
    wherein the chamber includes a chamber interior,
        wherein a plurality of slices including the catalyst extend in the chamber interior,
        wherein the slices are configured to enable axial flow of gas in the chamber interior,
    a flue gas inlet,
        wherein the flue gas inlet is configured to enable flue gas to enter the reactor body adjacent to the upper part between the inner wall and the chamber, and radially offset from the axis,
    a gas outlet,
        wherein the gas outlet is configured to enable gas to exit from the chamber interior,
    whereby flue gas entering the reactor from the gas inlet is caused to flow within the body with exposure to the catalyst, annularly and downwardly outside the chamber and then axially upward through the chamber interior to the gas outlet.

9. The apparatus of claim 8, wherein the chamber is bounded by a cylindrical wall, wherein the wall includes a chamber inner surface,
    wherein the chamber inner surface is coated with the catalyst.

10. The apparatus of claim 8, wherein within the chamber interior the slices are configured parallel to one another and perpendicular to the vertical axis.

11. The apparatus of claim 8, and further including
    a directing spacer,
        wherein the directing spacer is intermediate of at least two of the slices,
    whereby the directing spacer is operative to disturb laminar flow of the flue gases through the chamber interior.

12. The apparatus of claim 11, and further including a plurality of directing spacers wherein each directing spacer extends intermediate of respective immediately adjacent slices.

13. The apparatus of claim 12, wherein each directing spacer is configured to cause rotational flow of the flue gases.

14. The apparatus of claim 13, wherein each directing spacer includes a propeller shape.

15. The apparatus of claim 8, and further comprising an axial heater, wherein the axial heater extends within the chamber interior and along the vertical axis.

16. The apparatus of claim 8 wherein the chamber includes a chamber inlet to the chamber interior, and further includes a directing spacer,
    wherein the directing spacer is configured to disturb laminar flow of flue gasses,
        wherein flue gasses are caused to flow through the directing spacer before entering the chamber inlet.

17. The apparatus of claim 8, wherein the plurality of slices includes respective adjacent pairs of slices, wherein the slices of a respective pair extend at different angles relative to the vertical axis such that the slices of the pair are closer to each other along a direction transverse of the vertical axis.

18. The apparatus of claim 8, wherein the cylindrical chamber touches the undulating inner surface.

19. The apparatus of claim 8, wherein the reactor body includes a conical shaped portion below the portion having the cylindrical shape.

20. The apparatus of claim 8, wherein simultaneously within the reactor, NO is removed from the flue gases, carbonic particles contained in dust transported by flue gases is oxidized and inorganic dust from flue gases is removed.

* * * * *